United States Patent [19]

Keating

[11] Patent Number: 4,502,373
[45] Date of Patent: Mar. 5, 1985

[54] CLEANING SYSTEM FOR DEEP FRYER

[76] Inventor: Richard T. Keating, 144 N. Cuyler, Oak Park, Ill. 60302

[21] Appl. No.: 478,542

[22] Filed: Mar. 25, 1983

[51] Int. Cl.³ .............................................. A47J 37/12
[52] U.S. Cl. ...................................... 99/337; 99/408; 210/167
[58] Field of Search .................... 99/408, 337, 330; 426/417, 438; 210/167

[56] References Cited

U.S. PATENT DOCUMENTS

| | | | |
|---|---|---|---|
| 3,159,095 | 12/1964 | Wagner | 210/167 X |
| 3,210,193 | 10/1965 | Martin | 99/408 X |
| 3,734,744 | 5/1973 | Albright | 426/438 X |
| 3,970,558 | 7/1976 | Lee | 210/167 X |
| 4,444,095 | 4/1984 | Anetsberger et al. | 99/408 |

Primary Examiner—Billy J. Wilhite
Attorney, Agent, or Firm—Nicholas A. Camasto

[57] ABSTRACT

A common filter for one or more deep fat fryers includes a nozzle in the bottom of each fryer vessel for delivering filtered fat in a non-aerated whirlpool-like flow for flushing dislodged food particles through a drain to a portable filter tank. A pump delivers filtered fat from the filter tank to the nozzle for cleaning and refilling of the vessel.

3 Claims, 6 Drawing Figures

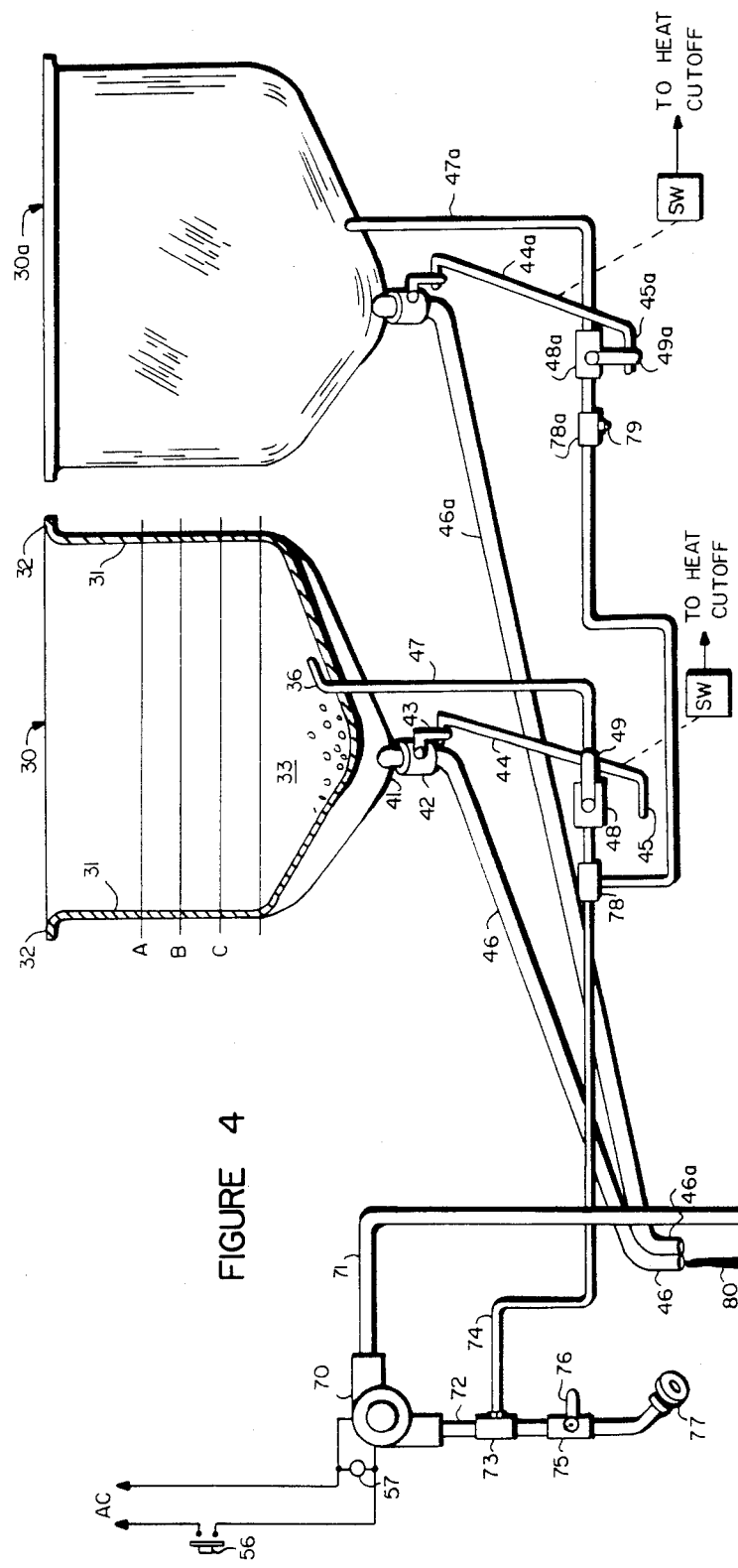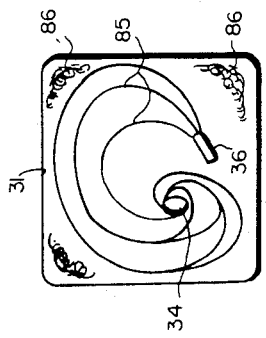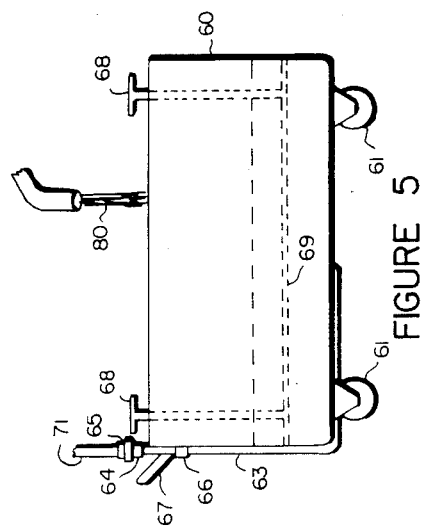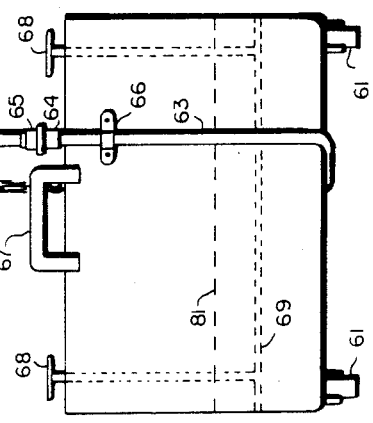

4,502,373

CLEANING SYSTEM FOR DEEP FRYER

BACKGROUND OF THE INVENTION AND PRIOR ART

This invention relates generally to commercial deep fryers and specifically to means for filtering the cooking fat therein and for cleaning the fryer of dislodged food particles.

Deep fat fryers in which a quantity of oil or fat is heated to pre-determined temperature for cooking foods suspended therein are well known in the art. It is also commonly known that the appearance and taste of foods prepared in such fryers is in large measure dependent upon the temperature and amount of fat absorbed by the food during cooking. A poor tasting or deteriorated fat adversely affects both the taste and appearance of foods cooked therein and is to be avoided.

Cooking fats break down and deteriorate for a variety of reasons, among which are cooking temperature, amount of air and moisture in the fat and the presence of so-called "debris" or dislodged and/or burned food particles. Deep fryers are generally designed with the heating elements supported above the bottom of the vessel or pot to provide a "cooler" zone between the vessel bottom and the heating elements. Dislodged food particles dropping to the bottom don't burn as rapidly because of the lower temperature and thus deteriorate the fat more slowly. Despite this, it is still necessary to regularly clean deep fryers to remove food particles and other debris by passing the fat through a filter mechanism to remove the fatty acids and solids. The fatty acids are a product of fat breakdown and contribute to the above-mentioned deterioration in appearance and taste of foods cooked in the fat. Since the fat is heated to a high temperature for cooking, the cleaning process is dangerous as well as time consuming.

One technique in the prior art for filtering cooking fat is known as the Keating Nutroilator Process from Keating of Chicago, Inc. In it free fatty acids are removed by adsorption with the use of a silicon dioxide powder and any particulate matter or debris is removed by filtration. A portable filter tank is placed beneath the fryer drain and the heated fat drained into it. The filtered fat is pumped back to the fryer by means of a hose. With the fryer drain open, the operator "hoses down" the bottom of the cooking vessel with filtered fat to flush food particles and debris from the vessel to the filter tank. When the vessel is clean, the drain is closed and the vessel refilled with the filtered fat via the hose. Since fat is absorbed by food during cooking, any required make up fat may be added to the fryer at this time.

The above cleaning and filtering technique has been used for years with good success. It does however require operator skill to effect cleansing of debris from the bottom of the vessel.

The system described in U.S. Pat. No. 3,900,580 utilizes a separate heater apart from the cooking vessel for heating the cooking oil. The pot includes a recessed filter bowl with a crumb trap arrangement for directing crumbs to a crumb well which communicates with a conveyor for mechanically removing crumbs. The oil is circulated in a turbulent flow by a pair of nozzles located at the sides of the pot above the bottom to work crumbs toward the filter. Oil is circulated for temperature control and continuously filtered. The system is quite complex and obviously very expensive.

OBJECTS OF THE INVENTION

Accordingly the principal object of the invention is to provide an improved filter and cleaning system for a deep fat fryer.

Another object of the invention is to provide a deep fat fryer cleaning system which does not require operator skill.

A further object of the invention is to provide a novel deep fat fryer cleaning system which overcomes the deficiencies of the prior art.

SUMMARY OF THE INVENTION

In accordance with the invention a deep fryer system includes a vessel containing a liquifiable fat or oil, means for heating the fat to cooking temperature and means suspending food in the heated fat for cooking. Dislodged particles of the food falling to the bottom of the vessel and tending to deteriorate the fat are removed by the provision of filter means for removing contaminants from the fat, means for subjecting the fat in the vessel to the filter means and means for circulating filtered fat in the vessel in a non-aerated cleansing flow for carrying dislodged food particles from the vessel.

BRIEF DESCRIPTION OF THE DRAWINGS

Further objects and advantages of the invention will become apparent upon reading the following description in conjunction with the drawings in which:

FIG. 4 is a schematic representation of a deep fryer cleaning and filtering system in accordance with the invention;

FIG. 5 is a reduced side view of the filter tank in FIG. 4; and

FIG. 6 is a plan view illustrating the non-aerated whirlpool-like cleansing flow produced in the system of the invention.

DESCRIPTION OF THE PREFERRED EMBODIMENT

Figure 1:
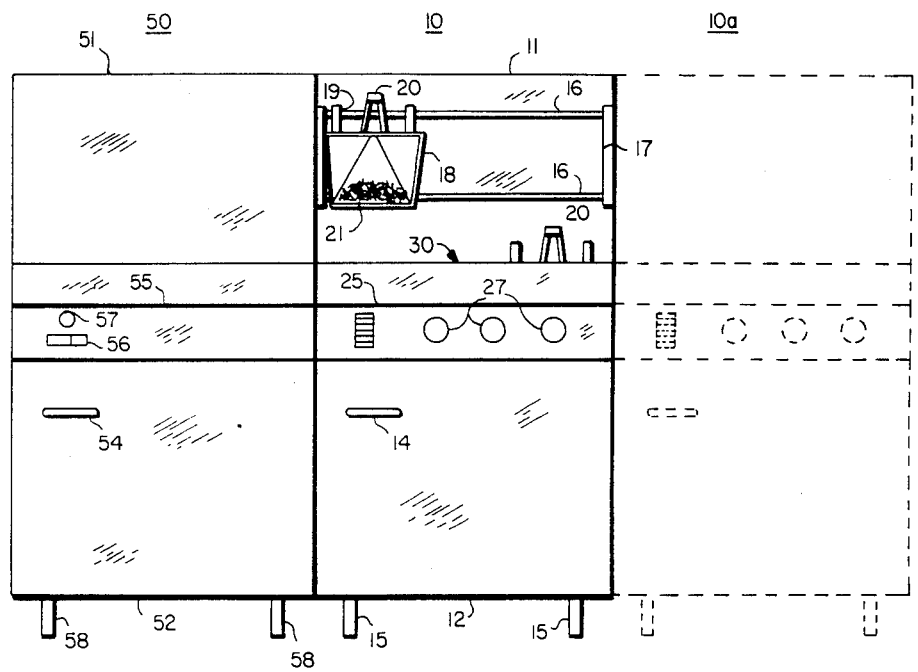
FIG. 1 schematically represents a deep fat fryer system of the invention.

Referring to FIG. 1 of the drawings, a deep fryer system is shown including a pair of fryers 10 and 10a and a filter cabinet 50. The fryers 10 and 10a may be similar to Model 14 TS Gas Fryers available from Keating of Chicago, Inc. Fryer 10 includes a cabinet having a back panel 11, a door 12 having a handle 14, and a support rack 17 on the back panel for hanging wire baskets 18 having support hooks 19. The baskets are of open construction for supporting food 21 in the heated cooking fat in a vessel 30 (not shown in this figure). The fryer also includes a control panel 25 having one or more indicating lights and switches 26 and a plurality of temperature and time control knobs 27. The fryer cabinet is supported by means of legs 15. As illustrated, baskets 18 may be supported on an upper support rod 16 for draining cooked foods or for holding raw or partly cooked foods preparatory to final cooking, with lower support rod 16 holding the basket in a horizontal position. Each basket is provided with a handle 20 for ease in handling. Fryer 10a is shown in phantom lines to illustrate the use of multiple fryers with a common filter.

Filter cabinet 50 has an external configuration which substantially matches that of fryers 10 and 10a. Cabinet 50 includes a back panel 51, a door 52 with a handle 54, legs 58 and a control panel 55 including a switch 56 and an indicating light 57. Since cabinet 50 merely provides a housing for the central filter system it does not include a vessel for deep-frying foods. Its horizontal surface may be used as a working surface in conjunction with operation of the commercial kitchen in which the fryers are installed.

Figure 2:
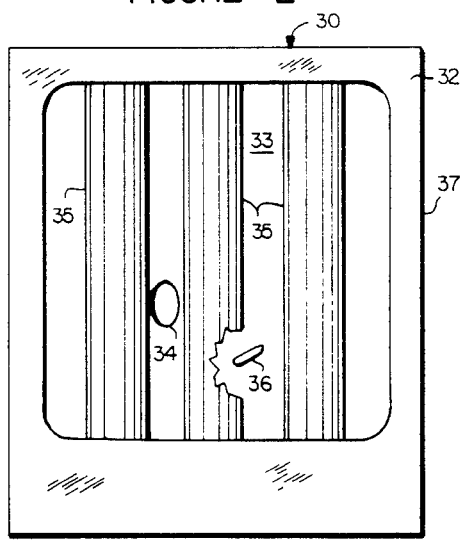
FIG. 2 represents a partial plan view of a gas heated deep fryer vessel.

In FIG. 2 the generally square shape of cooking vessel 30 is shown. A drain opening 34 is located in the bottom 33 of the vessel slightly to the left and forward of the center of the vessel. Vessel 30 has an upstanding wall 31 which flows into a surrounding support lip 32. An extended portion 37 of lip 32 serves as a working ledge at the front of the fryer. Three parallel heat tubes 35 are substantially equally spaced within the vessel. The heat tubes are generally oval in cross section, positioned above the bottom of the vessel and are adapted to be heated by gas flames within them. The construction is well known and will not be discussed in detail since it is of no concern to this invention. The middle heat tube is partially broken away to reveal a cylindrical nozzle 36 at the bottom 33 of vessel 30. As will be seen, nozzle 36 is the means whereby filtered fat is returned to the bottom of the vessel for flushing out debris which has settled on the bottom, and for refilling the vessel.

Figure 3:
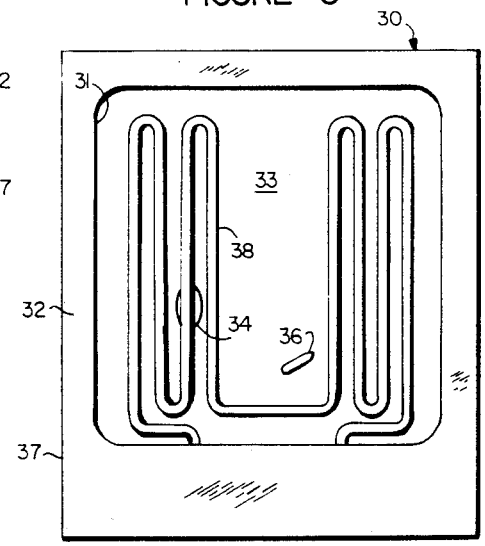
FIG. 3 represents a fryer vessel similar to that of FIG. 2 with electrical heating means.

The fryer vessel of FIG. 3 is identical to that of FIG. 2 except for the type of heating means employed for heating the cooking fat. FIG. 3 shows an electrical heating element consisting of one or more serpentine-like heating coils 38 suitably supported above the bottom of the vessel. The location of drain 34 and nozzle 36 are the same as illustrated in FIG. 2.

In FIG. 4 a pair of deep fryer vessels 30 and 30a are depicted in side-by-side relationship with 30 being sectioned to indicate the arrangement of nozzle 36 along tapered bottom 33. For clarity, the heating means are omitted. The horizontal lines labelled A, B and C indicate levels. A, for example, illustrates the proper level of heated fat in the vessel (in the absence of food suspended therein). B and C represent the upper and lower limits or levels occupied by the heating means. Thus the zone between C and the bottom of the vessel will be cooler than the cooking zone above B and dislodged food particles P resting on the bottom will not burn as rapidly. Upstanding wall 31 is substantially vertical and support lip 32 is substantially horizontal. A pipe 41 is welded to the bottom of the vessel and its open end forms drain 34 (not visible in this view). A drain valve 42, of any suitable conventional construction, having an operating lever or handle 43 is connected in series with pipe 41 and in turn, supplies a drain pipe 46 which is downwardly angled to permit draining of the vessel by gravity. Operating lever 43 is in engagement with and manipulated by a control rod 44 having a handle 45 formed at a right angle. Movement of control rod 44 back and forth along its length opens and closes the drain valve. For clarity, the support structures for the various elements are not illustrated.

Nozzle 36 is connected by means of an inlet pipe 47 to a flow control valve 48 having an operating handle 49. The operating handle is shown in its open position (horizontal and in line with the flow) and as such, is out of the way of movement of handle 45 of the control rod 44 thus allowing control rod 44 to be moved forward to open drain valve 42 as shown. As indicated by the dashed line joining a cut-off switch SW and control rod 44, switch SW is arranged to disable the heating means of the vessel whenever its control rod 44 is moved to allow the vessel to drain. Thus, when heated fat is being drained from the fryer, the flame in a gas-fired unit or the electrical power in an electrically powered unit, is cut off. This interlock prevents the gas tube or electrical coil from attaining excessively high temperatures.

A filter tank 60 is mounted on casters 61 for portability. A pipe 63 communicating with the bottom of the tank extends up the front wall and is fastened thereto by a clamp 66. Pipe 63 terminates in the male portion of a "quick connect" fitting 64, the female portion 65 of which is coupled to a flexible hose 71 coupled to the inlet side of a centrifical type pump 70. The output side of the pump supplies one end of a T-connector 73 through a short length of pipe 72. The middle of the T-connector 73 is connected via a pipe 74 to one end of a T-connector 78, the other end of which is connected to fluid control valve 48, previously described. The other end of T-connector 73 is connected to a valve 75 having an operating lever 76. The output side of the valve terminates in a female portion of a quick connect connector 77 and may be used for connecting an external hose for removal of cooking fat from filter tank 60 for other purposes than to return it to the cooking vessels. As is well known, the female portion of a quick connect connector acts as a shut off valve when the male portion is removed. Thus, in case of accidental disconnection of a hose with valve 75 open, fat will not be lost.

As indicated by reference 80, fat from fryer 30 is gravity drained into filter tank 60 via drain pipe 46 when drain valve 42 is open. The electrical circuit to pump 70 is shown with switch 56 being connected in series with pump 70 and a source of AC power and indicator light 57 being connected across the pump. The dashed lines 69 in filter tank 60 indicate a frame and filter screen arrangement. The frame is maintained in position by means of "hold downs" 68. The level of unfiltered fat in the tank is indicated by dashed line 81. A handle 67 is mounted to the front of tank 60 for ease in moving it.

In operation, when it is desired to clean and filter the cooking fat and to remove dislodged particles of food from the bottom of the vessel, flow control valve 48 is opened by moving operating handle 49 counter-clockwise to the position shown. Handle 45 on control rod 44 is then pulled forward to open drain valve 42. In the event heat to the deep fryer was not cut off prior to opening the drain valve, movement of control rod 44 will actuate switch SW to disable the heating means. The liquified cooking fat in the vessel flows by gravity through drain pipe 46 into filter tank 60. As mentioned above, in the Keating Nutroilator process, an acidox powder is spread on the filter screen to remove free fatty acids from the cooking fat. Particulate matter is mechanically filtered by the screen. When the vessel is empty, the operator turns on pump 70 by actuating switch 56. Pump 70 draws filtered cooking fat from the bottom of tank 60 through pipe 63, quick connects 64 and 65 and pipe 71 and supplies it under pressure through pipe 72, T-connector 73, pipe 74, T-connector 78, open flow control valve 48, and inlet pipe 47 to nozzle 36 and into the bottom of vessel 30. The filtered fat is discharged from nozzle 36 along the bottom to create a non-aerated whirlpool-like flow about the drain in the vessel. Dislodged food particles and debris are flushed from the vessel bottom and delivered through drain pipe 46 to the filter screen in filter tank 60. Nozzle 36 is positioned in a substantially parallel relationship to the portion of the tapered bottom it is adjacent and produces a low turbulence non-aerated flow of cooking fat. The non-aerated flow of fat flushes food particles out of the vessel without aerating the fat and thus a minimum of air is entrained by the fat which is a prime cause of fat breakdown.

After a short period the operator visually determines that the vessel is clean and closes the drain valve, while allowing pump 70 to continue to operate to refill the vessel. When the filter tank is empty, flow control valve 48 is closed, pump 70 is switched off, and cleaning of vessel 30 is complete.

Fryer vessel 30a is similarly arranged with respect to the common filter mechanism. It includes a separate, extended drain pipe 46a which also supplies cooking fat by gravity to filter tank 60. It, in turn, is supplied from pump 70 through the middle outlet of T-connector 78, to a T-connector 78a and a control valve 48a. A plug 79 in the middle of T-connector 78a is removable for connecting additional fryers in the same manner. Control rod 44a is shown in its closed position with its handle 45a blocked by the operating handle 49a of flow control valve 48a. An electrical interlock is indicated by the dashed line joining control rod 44a and a switch SWa for controlling heat cut-off to the fryer when its drain valve is open. It will be appreciated that while separate drain pipe returns have been illustrated, the drains may be joined into a common return.

FIG. 5 is a reduced side view of filter tank 60 more clearly showing the arrangement of pipe 63 and clamp 66. The tank is readily movable by disconnecting quick connect portions 64 and 65 which disconnects flexible pipe 71 and permits removal of filter tank 60 to a suitable area for replacement of the filter screen 69 and for general cleaning of the tank, if required.

FIG. 6 generally illustrates the whirlpool-like flow pattern developed as a result of the placement of nozzle 36 with respect to the bottom surface of the vessel and drain 34. As will be apparent to those skilled in the art, the area of the bottom of the vessel, the rate of fat discharge from nozzle 36 and the size of the drain are selected to produce a whirlpool-like flow of sufficient velocity to flush dislodged food particles from the bottom of the vessel, with minimum turbulence to minimize air entrainment. The helical lines 85 generally indicate the predominant flow path with areas of turbulence 86 being confined to the corners of the vessel.

What has been described is a novel cleaning and filtering system for a deep fryer in which a non-aerated flow of fat is supplied to the bottom of the vessel for flushing particulate matter therefrom. It is recognized that numerous modifications in the described embodiment of the invention will be apparent to those skilled in the art without departing from its true spirit and scope.

The invention is to be limited only as defined in the claims.

What is claimed is:

1. A common filter and cleaning system for at least two deep fat fryers each of which includes a vessel having a tapered bottom and a drain for holding a quantity of liquifiable fat or oil, means in said fat for heating said fat to cooking temperature and means for suspending food in said heated fat for cooking, dislodged particles of food falling to the bottom of said vessel and tending to deteriorate said fat, comprising:
   filter means including a portable tank having a filter screen for removing contaminants from said fat;
   drain valve means for passing fat from each of said vessels through said filter screen into said portable tank; and
   a nozzle in the bottom of each said vessel for circulating filtered fat along the bottoms of said vessels in a whirlpool-like non-aerated cleansing flow for carrying dislodged food particles from said vessels to said filter screen;
   wherein each said nozzle is connected to a separate flow control valve;
   separate interlock means operatively associated between each said drain valve means and the respective flow control valve for precluding opening of a drain valve unless its corresponding flow control valve is open; and
   a pump for returning filtered fat to said vessels through said nozzles via said flow control valves.

2. A filter system as set forth in claim 1, further including;
   disconnect means for coupling said tank to said pump.

3. A filter and cleaning system for a deep fat fryer which includes a vessel and a drain for holding a quantity of liquifiable fat or oil, means for heating said fat to cooking temperature and means for suspending food in said heated fat for cooking, dislodged particles of food falling to the bottom of said vessel and tending to deteriorate said fat, comprising:
   filter means for removing contaminants from said fat;
   drain valve means for passing fat from said vessel through said filter means;
   a nozzle in the bottom of said vessel for circulating filtered fat within said vessel in a cleansing flow for carrying dislodged food particles from said vessel to said filter means;
   a flow control valve connected to said nozzle;
   interlock means operatively associated between said drain valve means and said flow control valve for precluding opening of said drain valve means unless said flow control valve is open; and
   a pump for returning filtered fat to said vessel through said nozzle via said flow control valve.

\* \* \* \* \*